Feb. 21, 1967     H. F. WELSH     3,305,731
LEVEL CORRECTION CIRCUIT
Filed May 29, 1963     2 Sheets-Sheet 1

INVENTOR
HERBERT FRAZER WELSH

BY *David Leschine*

ATTORNEY

United States Patent Office 3,305,731
Patented Feb. 21, 1967

3,305,731
LEVEL CORRECTION CIRCUIT
Herbert Frazer Welsh, Philadelphia, Pa., assignor to Sperry Rand Corporation, New York, N.Y., a corporation of Delaware
Filed May 29, 1963, Ser. No. 284,189
7 Claims. (Cl. 307—88.5)

This invention relates to a level correction circuit and more particularly to a level correcting circuit which converts a D.C. signal of varying amplitude into a D.C. signal of equal positive and negative amplitudes about an inserted reference level.

In many system applications for the proper alignment of component assemblies or tuning of circuit elements, it is necessary to provide bi-polar control signals. The signals of a first polarity may indicate movement of servo systems in a first direction whereas signals of a second polarity may indicate movement in a second direction. The required bi-polar signals may, however, not be available within the associated input equipment. The available signals may consist of one polarity signal of different amplitudes. The amplitudes of these signals carrying the desired servo movement information. It is thus necessary to provide a device which can accept these signals of a single polarity and a plurality of amplitudes and produce bi-polar signals of uniform positive and negative amplitudes. This may be done by inserting a new reference level, midway between the relative amplitudes of the adjacent single polarity signals and controlling the maximum levels at which signals may exist above and below this reference. The duration of the original signal, that is the length of time a given amplitude level existed may be reflected in the respective bi-polar signal by its duration before a polarity change.

An example of circuit which produces a D.C. signal of the type described and which requires a further D.C. signal of the type also described, is found in United States patent application Serial No. 170,923, for Alternate Frequency Homing, by Robert A. Pacl, Jr., filed February 5, 1962, and assigned to the assignee of the present application. In this application is disclosed a system for accurately positioning a read-write transducing head with respect to an information track or track group upon a magnetizable record. The transducer is initially placed relative to a selected track or track group by a course positioning device. Once the transducer is so positioned, a fine positioning device is actuated to cause the accurate placement of the transducer with respect to said track or track group.

The fine positioning device employs a pair of homing tracks, one placed on either side of the information track or track group. One of each pair of such tracks has prerecorded therein short lengths of a particular frequency signal, known as dots, regularly spaced along the length of the track. The other one of said track pairs has prerecorded therein additional signals, called dashes, arranged to occupy a position between respective dots. The dashes are of the same frequency as the dots but are three times as long in duration as the dot recordings.

The read-write transducer as it traverses the information track or track groups also passes over and senses the signals of the homing tracks. If the transducer has been correctly placed with respect to the desired information track or track group, the signal read from the homing tracks will appear as a constant amplitude sine wave. This is due to the placement of the transducer over equal portions of both homing tracks. The signal read from the dot track will fill in the spaces read from the dash track and the resultant signal will be continuous.

In the event that the transducer is displaced from the information track in the direction of the dash track, the transducer will now be placed, so as to traverse a greater portion of the dash track and a decreased portion of the dot track. The strength of the signals sensed by the transducer from the homing tracks will thus be altered. The signal component from the dash track will be stronger whereas the signal component from the dot track will be diminished. The combined signal now sensed by the transducer will consist of a portion of a high amplitude sine wave extending for a period equal to the dash recording, followed by a portion extending for a period equal to the dot recording, of a low amplitude sine wave. In the event, the transducer was displaced towards the dot homing track the dot signals would be stronger and the dash signals diminished from those levels which would exist when the transducer was properly placed. This composite wave would appear as a high amplitude portion, extending for the period equal to the dot recording, followed by a low amplitude portion extending for the period equal to the dash recording.

The mixed signal read by the transducer is fed over output lines to a filter network. The filter serves to remove the information signals from the mixed filter input, and passes the information to a utilizing device. The remaining composite homing signal is passed through an amplifier to the primary of a transformer. The secondary of the transformer has its center tap grounded and its remote ends connected through diodes, and a resistor to a negative potential. Thus, the output of the secondary of the transformer will be a rectified sine wave of twice the input frequency. The transformer output is then fed to a low pass filter to produce a D.C. signal whose levels agree with the respective amplitudes of the A.C. input.

It is then required that this single polarity, multi amplitude D.C. signal from the low pass filter be converted to a bi-polar D.C. signal of equal positive and negative amplitudes, and whose durations at each polarity are equal to the durations of the equivalent single polarity D.C. levels of the input signal. The resulting bi-polar D.C. signal can then be averaged to produce a signal, which is positive or negative, to operate a differential servo to cause the transducer to be shifted to a position in alignment with the information track. The proper positioning of the transducer will cause a uniform amplitude signal to be produced as described above, which will terminate the differential inputs to the servo and the transducer will remain in alignment with the information track.

The circuit for producing the bi-polar D.C. signal, described above is known as a level correction circuit. The circuit responds to the changes in the levels rectified, filtered multi-level D.C. signal produced by the low pass filter to produce the desired bi-polar signal. That is, the circuit is responsive the positive or negative change of the D.C. signal from one D.C. level to another. The circuit consists of one circuit branch which is responsive to positive changes to produce a positive D.C. level of a given amplitude and a further circuit branch which responds to negative changes to produce a negative D.C. level of the same amplitude as the positive D.C. level. The outputs of the branches are alternatively impressed upon the output circuitry to produce a single output.

It is therefore an object of this invention to provide an improved level correction circuit.

It is a further object of this invention to provide a level correction circuit which can respond to the changes in level of a D.C. signal of one polarity with respect to ground and produce a D.C. signal of equal positive and negative amplitudes.

It is yet another object of this invention to provide a level correction circuit which can respond to the changes in level of a D.C. signal of one polarity with respect to ground and produce a D.C. signal of equal positive and negative amplitudes and whose respective durations are equal to the length of time the original D.C. signal remained at a given level.

It is still another object of this invention to provide a level correction circuit which is simple to construct and which employs merely capacitor, resistor and diode components.

Other objects and features of the invention will be pointed out in the following description and claims and illustrated in the accompanying drawings, which disclose by way of example, the principle of the invention.

In the drawings.

Similar elements are given similar reference numerals in each of the respective drawings.

Figure 1:
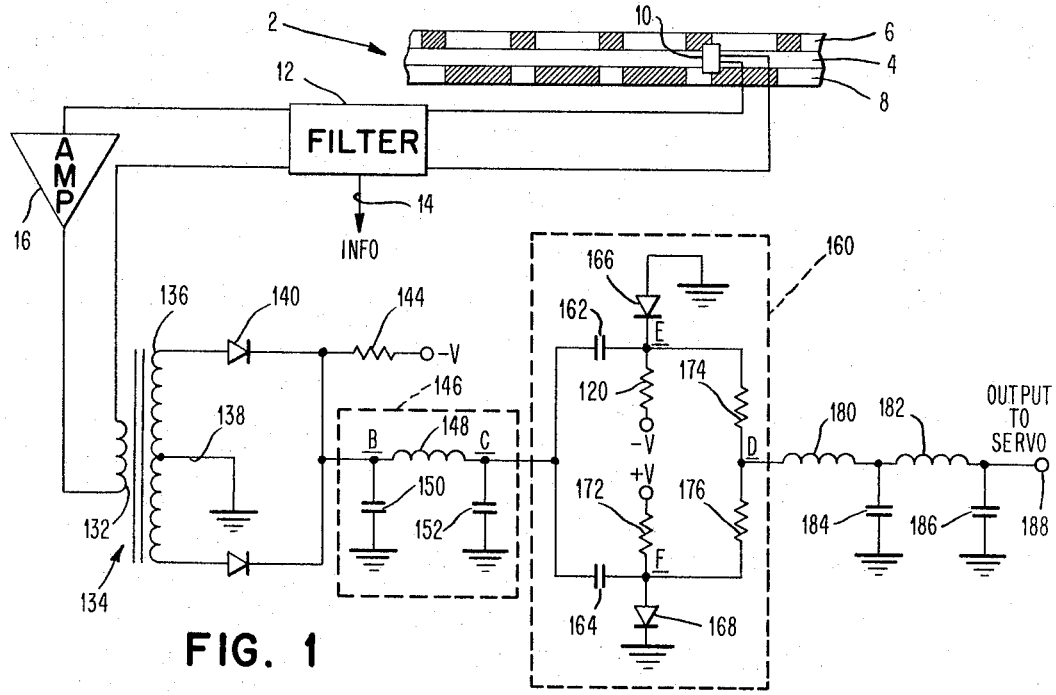
FIGURE 1 illustrates a device constructed in accordance with the basic concept of the invention, as well as related input circuits.

Referring to FIGURE 1, there is shown a level correction circuit constructed according to the basic concepts of this invention with related input circuits. A magnetic record 2 upon which information tracks 4 and homing tracks 6 and 8 are located is constantly moved past a magnetic read-write transducer 10 by a drive means (not shown). The magnetic record 2 may take the form of a magnetic drum surface, a magnetic tape, record card or the like. The information tracks 4 may be single tracks or a plurality of adjacent tracks. The homing track 6, contains dot signals, which are recordings of a given frequency signal at a chosen amplitude at regular intervals along the track 6. In homing track 8, are placed the dash signals which are recordings of the same frequency and amplitude as the dot but exist for three times the duration of the dot recording. The dash recordings extend for the period between consecutive dot recordings. The signal picked up by the transducer 10 (a mixed signal composed of the homing signals and the information signals) is passed to a filter network 12. The filter network 12 serves to separate the information signals from the homing signals. The information signals are fed over the line 14 to a utilizing device. The homing signals, after being amplified by amplifier 16, are fed to the primary winding 132 of a transformer 134. The center tap 138 of the secondary winding 136 of the transformer 134 is grounded. The two opposite ends of the secondary winding are connected to the anodes of diodes 140 and 142, the cathodes of which are joined together and tied through a resistor 144 to a source of negative potential. The cathodes of the diodes are also connected to the input section of a low pass filter 146. The diodes thus providing a full wave rectifier so as to apply a rectified alternating current of twice the transformer input frequency to the low pass filter 146.

The low pass filter 146 is constructed of a series inductance 148 and a pair of shunt capacitances 150 and 152 each ground at one side. The output of the low pass filter 146 is in the form of a modulated D.C. signal, the ripple or modulation being of a frequency equal to that of the input of the low pass filter 146.

The output of the low pass filter 146 is passed into the level correcting circuit. The D.C. restorer is composed of two parallel branches each containing a capacitor, a diode and bias and output load resistors. A first branch includes capacitor 162, bias resistor 170 connected to a source of negative potential —V, an output load resistor 174 and a diode 166 connected at its anode to ground. One side of each of these elements is connected at a common point E. The second branch includes capacitor 164, bias resistor 172 connected to a source of positive potential +V, an output load resistor 176 and a diode 168 connected at its cathode to ground. One side of each of these elements is connected at a common point F. The capacitors 162 and 164 are of the same values. The values of the resistors and capacitors are chosen so as to present a long R (time constant to the input signals at C). The diodes 166 and 168 are oppositely poled. An output voltage is taken from the level correction circuit at the common connection of output load resistors 174 and 176. The output of the level correction circuit will be a bipolar D.C. signal as described above.

The output of the level correction circuit 160 is passed to an additional low pass filter composed of series inductances 180 and 182 and shunt capacitors 184 and 186 placed on either side of the inductance 182. The capacitors 184 and 186 are grounded at their opposite ends. This final low pass filter acts as a type of integrating circuit to produce a signal the amplitude and polarity of which is in accordance with the average value of the output signal of the level correction circuit 160. The output of the low pass filter at terminal 188 is then passed to a differential servo (not shown) to correct the position of the transducing device. The manner in which the overall system operates is described in detail in the cited copending application Serial No. 170,923 and will not be repeated herein.

Figure 4:
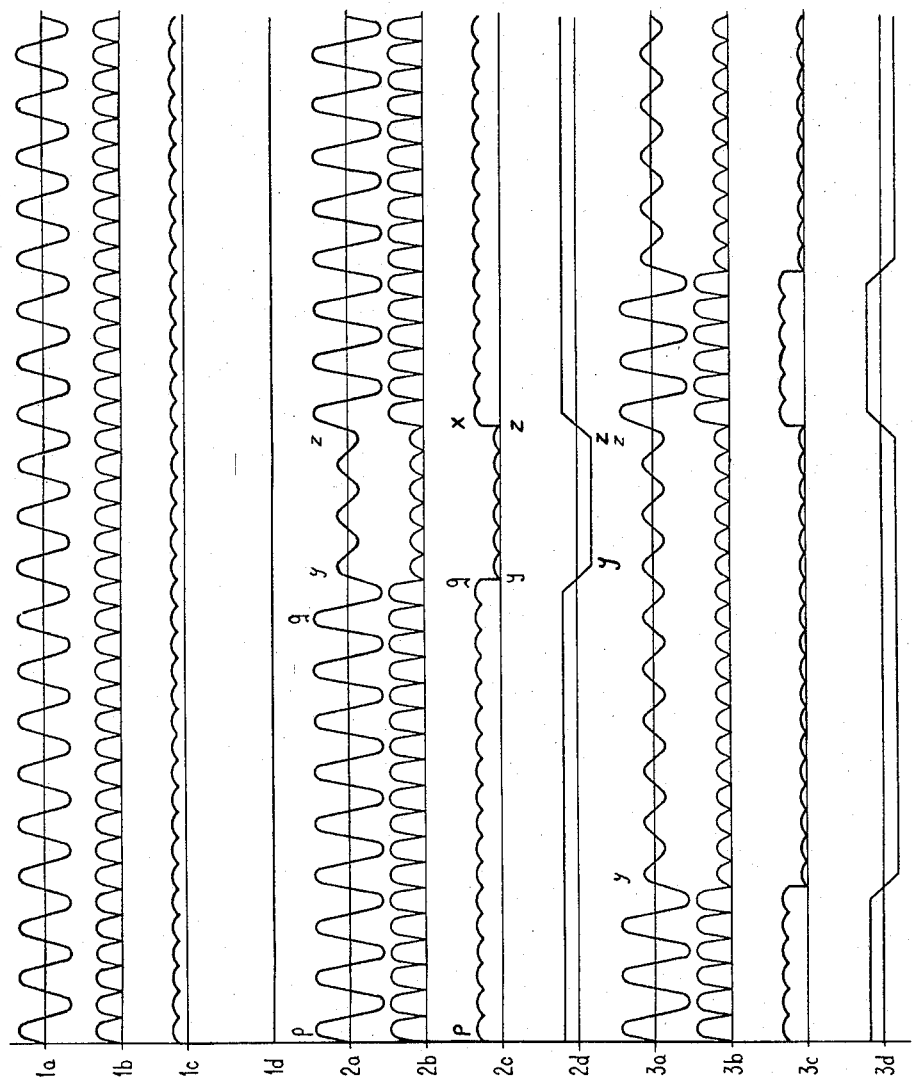
FIGURE 4 illustrates the waveforms which exist at selected points within the device of FIGURE 1 and the waveforms of the input signals.

Referring to FIGURE 4, the waveforms for various points in the level correction circuit as well as input and output circuitry related to the level correction circuit are shown. FIGURE 4 is composed of three groups designated 1, 2 and 3 of four waveforms each, designated a, b, c and d. The a waveform of each group represents the input waveform to the primary winding 132 of transformer 134. The b waveform of each group represents the rectified output presented as an input to the low pass filter 146. The c waveform of each group represents the output of the low pass filter 146. The d waveform of each group represents the output of the D.C. restorer.

The group 1 waveforms represent the waveforms produced when the read-write transducer 10 is properly positioned with respect to the information track or track group 4. The group 2 waveforms represent the waveforms produced when the read-write transducer is misaligned with the information track or track groups and occupies a position wherein it overlaps the dash track 8 to a large extent and has minimal contact with the dot track 6. The group 3 waveforms represent the waveforms produced when the read-write transducer is misaligned with the information track or track groups 4 and occupies a position wherein it overlaps the dot track 6 to a large extent and has minimal contact with the dash track 8.

The operation of the level correction circuit will now be described with reference to the circuit of FIGURE 1 and the waveforms of FIGURE 4. Assuming initially that the read-write transducer 10 is properly aligned with the information track or track group 4 a signal having a waveform as shown in FIGURE 4 at line 1a, will be applied to the primary winding 132 of transformer 136. This wave will appear as a continuous constant amplitude sine wave. This is due to the fact that the transducer 10 overlaps both homing tracks 6 and 8 to the same extent, thus receiving sine waves of the same amplitude. The signals from the dot track 6 fill in the gaps provided by the dash track 8 recordings to produce the continuous waveform shown. The input signal passes through the transformer and is applied to the rectifying diodes 140 and 142 in the secondary winding 136 of the transformer. The output of the diodes appears at point b (the input to low pass filter 146) as a rectified sine wave of twice the frequency of the input at point a. This waveform is illustrated at 1b in FIGURE 4. The signal is then passed through the low pass filter 146 and produces a modulated D.C. waveform whose modulation or ripple is of the same frequency as the input to the filter section. This waveform is shown as 1c in FIGURE 4.

The output of low pass filter 146 is introduced to the input of the level correction circuit. In that the level correction circuit is capacitor coupled, that is, each branch has a capacitor, it will only respond to the A.C. component of the wave applied. Thus, the level correction circuit is only responsive to a change in the D.C. level of the inputs and will treat a change to a higher D.C. level as a positive input, whereas a change to a lower D.C. level is a negative input. The circuit components are so chosen that the small A.C. ripple on the input to the restorer are ineffective to operate the restorer. Hence, since the input wave is of constant amplitude the level correction circuit will have a zero A.C. input signal applied to it. In this case, a small current will flow in the top branch from ground through the diode 166, the bias resistor 170 to the negative source —V, keeping point e at a voltage slightly below ground, due to the drop through diode 166. A current will also flow from the positive potential +V, through bias resistor 172, diode 168 to ground. Thus, the voltage at point f will remain slightly positive, as determined by the voltage drop through bias resistor 172.

Accordingly, substantially no current will flow through the output load resistors and thus the output at point d will appear as a constant D.C. level of ground potential, as shown at line 1d of FIGURE 4. The final filter sections will also produce a D.C. level at ground potential. The output signal thus available at terminal 188 will be ineffective to alter the servo position, and the head position will be maintained.

In the event, however, that the read-write transducer 10 deviates from its desired position and takes up a position where it overlaps the dash homing track 8 to a greater extent and overlaps the dot homing track 6 to smaller extent, a waveform as shown at line 2a will be produced at the primary winding 132 of transformer 136. The waveform has a section from p to q, equivalent to the length of the dash recording, of increase amplitude. This increase amplitude is due to the position of the transducer over a greater portion of the dash track. The section of the waveform y to z is equivalent to length of the dot recording, and is of decreased amplitude due to the transducer being more remote from the dot track.

Figure 2:
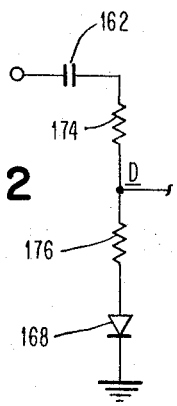
FIGURE 2 illustrates the effective portion of FIGURE 1 in the presence of a positive change of the input signal.
Figure 3:
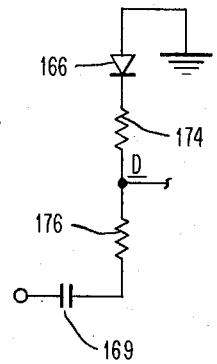
FIGURE 3 illustrates the effective portion of FIGURE 1 in the presence of a negative change of the input signal.

This input (FIGURE 2a) to transformer 136 is rectified, as shown by line 2b of FIGURE 4, and filtered as shown by line 2c of FIGURE 4 and introduced to the input of the level correction circuit 160. The first change in D.C. level as seen by the D.C. restorer is the negative change from point q at one D.C. level to point y at a lower D.C. level. This negative change or negative signal causes point F to go negative until the anode of diode 168 goes more negative than ground and causes diode 168 to disconnect. The negative input is also applied to point E which makes diode 166 conduct and clamp point e to the ground potential of the anode. As a result, a current path is established from ground, through diode 166, output load resistors 174 and 176, and capacitor 164 to the negative input as shown in FIGURE 3. The output signal, taken from the central position of the voltage divider composed of output load resistances 174 and 176 will appear as a negative signal, with respect to ground, equal to half the voltage drop across the whole divider. This output due to the long RC constant of the resistors and capacitor will appear as a static level until a further input is applied to the level correction circuit due to a change in the D.C. level at point c. Thus the negative level will continue for a duration equal to the dot recording and illustrated on the waveform of line 2c of FIGURE 4, as extending from points y to z.

The next change in level occurs when the output of the dash track portion is detected. A positive increase in level is shown in line 2c of FIGURE 4 as taking place between the points z and x. This positive change places a positive input to the level correction circuit 160. The positive input causes point e to rise positively until the cathode of diode 166 goes above ground, at which point diode 166 disconnects. The positive input, also applied to capacitor 164 causes point f to go positive and permits diode 168 to conduct but clamps it at ground potential due to the grounded cathode of diode 168. A current path is thus established from the positive input source, through capacitor 162, output load resistors 174 and 176, the diode 168 to ground, as shown in FIGURE 2. The output, when measured with respect to ground is a positive level equal to one-half the drop across the voltage divider 174–176. This output due to the long RC time constant will also appear as a static level until the next change takes place. The output waveform is shown at line 2d of FIGURE 4.

As is obvious from an examination of waveform 2d of FIGURE 4, the average of the positive and negative portions of the wave will be positive and thus a positive output will be provided by the circuit composed of elements 180, 182, 184 and 186 at terminal 188. The positive signal applied to the differential servo will cause it to move in a predetermined direction toward the information track until the waveform as shown at line 1d is restored.

In the event the read-write transducing device 10 is displaced towards the dot track 6, a waveform with increased amplitude for the dot intervals and decreased amplitude for the dash intervals would be created. The resulting waveform for such a condition is shown at line 3a of FIGURE 4. This wave when rectified (shown at line 3b) and filtered (shown at line 3c) will again be applied to the level correction circuit 160. The operation of the restorer will be similar to that described above. The output wave will be altered, however, as shown in line 3d of FIGURE 4. The output will consist of a long duration of negative signal due to the low level dash signal and short periods of high level signals due to the dot signals. The average of this signal produced by the averaging circuit will be a negative signal which applied to the differential servo, will cause it to move in a second direction until a waveform as shown at line 1d of FIGURE 4 is re-established.

While the level correction circuit has been described with relation to one specific circuit it should be understood that such a level correction circuit could readily be adapted by one skilled in the art to further uses where such a D.C. signal output is required. It is also obvious that many modifications in the form and operation of the level correction circuit shown and described may be made by those skilled in the art without departing from the inventive concepts disclosed herein.

The embodiments of the invention in which an exclusive property or privilege is claimed are defined as follows:

1. A level connecting device for converting single polarity electrical signals of varying levels into bi-polar direct current signals of equal positive and negative levels comprising: an input line adapted to receive said single polarity electrical signals; a first circuit path connected to said input line and further comprising in series relationship a first input capacitor, a first resistor, a second resistor and a first unilateral conducting device connected to a first source of potential at its second terminal, said first circuit path producing a positive direct current level with respect to said first potential source level when the signal applied to said input line changes from a first level to a second higher level, said positive direct current level having a duration equal to the duration said single polarity single remains at said second level; a second circuit path connected to said input line and further comprising in series relationship a second input capacitor, said second resistor, said first resistor, and a second unilateral conducting device connected to a second source of potential at its second terminal, said second circuit path producing a negative direct current level with respect to said second potential source level when the signal applied to said input line changes from said second level to said first level, said negative direct current level having a duration equal to the duration said single polarity signal remains at said first level; and an output line connected to the junction of said first and said second resistors.

2. A device as claimed in claim 1, which further comprises: an integrating means connected to said output line to produce an output signal which is positive or negative depending upon the relative durations of said positive and negative direct currents.

3. A device as claimed in claim 1, wherein said first and second sources of potential are at ground potential.

4. A level correcting device for converting single polarity electrical signals of varying levels into bi-polar direct current signals of equal positive and negative levels comprising: an input line adapted to receive said single polarity electrical signals; a first circuit path connected to said input line and further comprising in series relationship a first input capacitor, a first resistor, a second resistor and a unilateral device, said unilateral device connected at its anode to said second resistor and further connected at its cathode to a first source of potential; said junction between said first input capacitor and said first resistor further being connected by means of a third resistor to a second source of potential; said first circuit path producing a positive direct current level with respect to said first potential source level when the signal applied to said input line changes from a first level to a second, higher level, said positive direct current level having a duration equal to the duration said single polarity signal remains at said second level; a second circuit path connected to said input line and further comprising in series relationship a second input capacitor, said second resistor, said first resistor and a second unilateral device, said unilateral device connected at its cathode to said first resistor and further connected at its anode to a third source of potential; said junction between said second input capacitor and said second resistor further being connected by means of a fourth resistor to a fourth source of potential; said second current path producing a negative direct current level with respect to said third potential source level when the signal applied to said input line changes from said second level to said first level, said negative direct current level having a duration equal to the duration said single polarity signal remains at said first level; and an output line connected to the junction of said first and second resistors.

5. A device as claimed in claim 4, wherein said first and third sources of potential are ground potentials, said second source of potential is a negative source of potential and said fourth source of potential is a positive source of potential.

6. A device as claimed in claim 5, wherein said first input capacitor and said first and third resistors comprise a network with a long RC time constant and further said second input capacitor and said second and fourth resistors comprise a further network with a long RC time constant.

7. A device as claimed in claim 6, which further comprises: an integrating means connected to said output line to produce an output signal which is positive or negative depending upon the relative durations of said positive and negative direct currents.

References Cited by the Examiner

UNITED STATES PATENTS 3,219,842   11/1965   Greunke et al. _____ 307—88.5

MAYNARD R. WILBUR, *Primary Examiner.*

A. L. NEWMAN, *Assistant Examiner.*